March 11, 1930.  J. R. F. M. LASMOLLES  1,750,229
HEAT ENGINE ACTING AS A PUMP
Filed Nov. 1, 1926
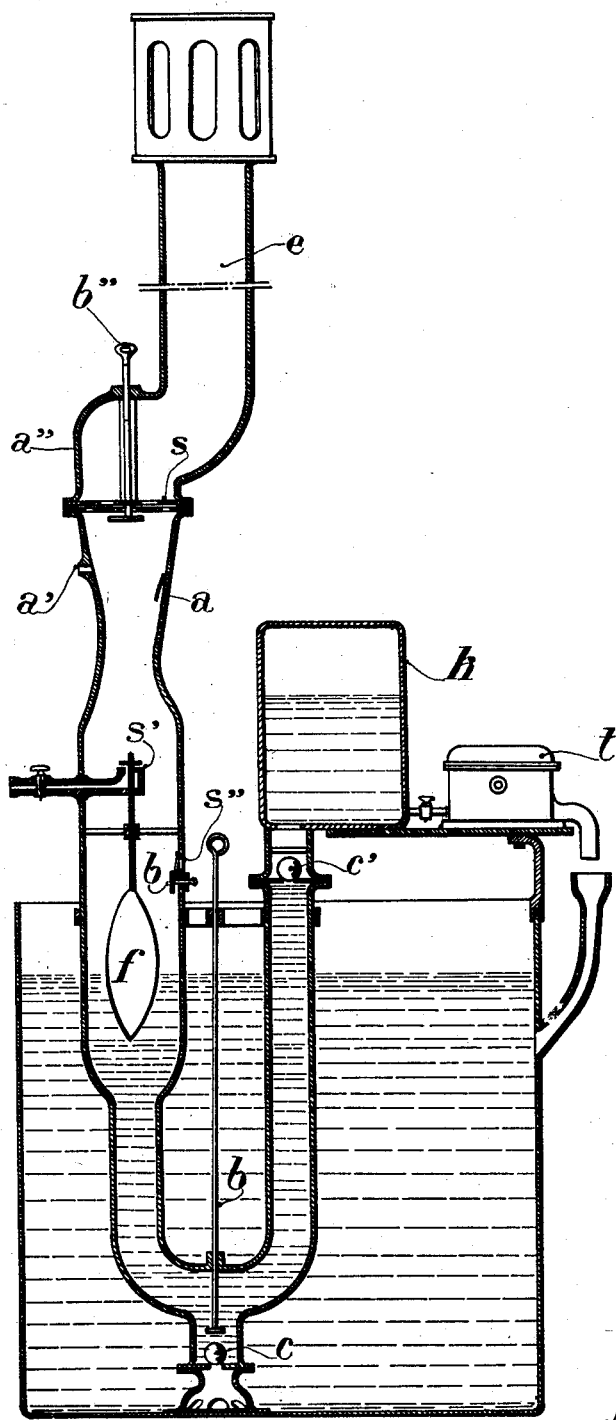

Patented Mar. 11, 1930

1,750,229

UNITED STATES PATENT OFFICE

JEAN RAOUL FRANÇOIS MARIUS LASMOLLES, OF NERAC, FRANCE

HEAT ENGINE ACTING AS A PUMP

Application filed November 1, 1926, Serial No. 145,639, and in France November 17, 1925.

The invention relates to heat engines, more particularly that type of engines in which the explosion acts as a fluid and in which there is no previous compression, there being a lowering of the temperature of the gases after their expansion. One of the objects is to increase the efficiency and to construct a heat engine of this type in such a manner that it is adapted for continuous and heavy use.

In the accompanying drawings:—

The figure is a vertical sectional view of the engine.

From the following formula the coefficient of efficiency is shown to be greater than in internal combustion engines or those of different cycles having a previous compression or explosion.

Viz:—

$\rho$ = coefficient of efficiency.
$Q$, amount of heat corresponding to the explosion;
$q$, amount of heat lost;
$t$, temperature of the mixture;
$T$, temperature of the explosion;
$t'$, temperature at the end of the expansion;
$t''$, final temperature after expansion.

We have:—

$$\rho = \frac{Q-q}{Q};$$
$$Q = c(T-t);$$
$$q = c(t'-t'');$$

from which it results that $$\rho = 1 - \frac{(t'-t'')}{T-t},$$

and since $\frac{t'}{T} = \frac{t''}{t}$, it follows that $\rho = 1 - \frac{t''}{t}$.

Referring to the drawing, the explosion acts upon a fluid, particularly water. There is an explosion and mixing chamber on the top of which is provided an exhaust pipe. At the base of the explosion chamber there is arranged a pump having a suction valve $c$ and a delivery valve $c'$. A vessel for regulating the pressure, or a delivery pipe may be secured on the valve $c'$.

An inlet valve for the admission of a rich carburetted mixture or of any carburetting gas (gasoline, rich or producer gas, petroleum vapors, acetylene) is provided at $s'$. This valve is controlled by a float $f$ by means of a suitable rod. An air inlet and scavenging valve is arranged at $s''$. Several of these valves can be provided. Finally, an annular exhaust valve $s$ allows the burnt gases to escape. The opening of the valves $s$, $s''$ and $c$ is adjustable by the screws $b''$ $b'$ and $b$.

The apparatus is inserted to a suitable level in a vat full of water, or in any stream of water, according to the applications desired.

In the case of a vat, the pressure regulating vessel $k$ distributes the water to a turbine, Pelton wheel, or any hydraulic motor.

After driving action, the water comes back to the vat.

The apparatus when inserted in a stream of water may be used for feeding the water to a certain height in a basin for domestic uses, or for irrigation purposes, etc.

If the apparatus is placed in a boat, the water can be sucked in at the front, discharged at the rear and the apparatus becomes a propelling apparatus.

The ignition of the explosive mixture may be electrically effected by means of an ordinary sparking plug at $a'$, or by any other means such as a flame or the like.

The exhaust may be an open exhaust through an isolated pipe and a lantern for promoting the exhaust of the gases, or it may be a forced exhaust, a centrifugal or like aspirator being arranged on the exhaust piping.

The operation is as follows:

The apparatus is inserted in a vat full of water. The level of the water at the beginning is the same in the vat and in the apparatus. The valve $s$ is open as well as $s''$. A sparking plug is provided at $a'$ and at the terminals of this sparking plug a continuous spark is produced. If gasoline vapors or a gas are caused to enter through $s'$, these vapors ascend and mix with the inner air of the apparatus, the mixture being facilitated by the trumpet shape of the explosion chamber; when the mixture becomes explosive and comes into contact with the spark plug at $a'$, the ignition is so timed that it ignites the mixture. The valves $s$, $s''$, $s'$ and $c$ will be suddenly closed and the water contained in the apparatus opening the valve $c'$ will rush in the vessel or tank $k$. The gases will expand below atmospheric pressure and will create a partial vacuum. At this moment, the valves $s$, $s''$ and $c$ will again open, the air will evacuate the burnt gases which will escape through $s$, the water entering at $c$ will reach the level of the vat and will lift the float which will open the inlet valve $s'$ and the same phenomenon will again take place.

What I claim as my invention and desire to secure by Letters Patent is:—

1. In a thermal pump, a cranked body, of which the lower part dips in the liquid, a suction valve in said lower part, a delivery valve on one of the arms of the cranked body, a pipe for admission of combustible gases in the second arm of the body arranged vertically, a valve for closing said pipe, a float arranged in the second arm for actuating said valve, means for igniting the combustible gas, and means for the escape of the burnt gases.

2. In a thermal pump, a cranked body, of which the lower part dips in the liquid, a suction valve in said lower part, a delivery valve on one of the arms of the cranked body, a pipe for admission of combustible gases in the second arm of the body arranged vertically, a valve for closing said pipe, a float arranged in the second arm for actuating said valve, an air admission valve opening towards the interior, and a valve for the escape of the burnt gases also opening towards the interior.

3. In a thermal pump, a cranked body, of which the lower part dips in the liquid, a suction valve in said lower part, a delivery valve on one of the arms of the cranked body, a pipe for admission of combustible gases in the second arm of the body arranged vertically, a valve for closing said pipe, a float arranged in the second arm for actuating said valve, an air admission valve opening towards the interior, means for igniting the combustible gases, a valve for the escape of the burnt gases also opening towards the interior, and an evacuation chimney surmounting said valve.

In testimony whereof I have signed my name to this specification.

JEAN RAOUL FRANÇOIS MARIUS LASMOLLES.